United States Patent
Sato et al.

(10) Patent No.: US 10,605,384 B2
(45) Date of Patent: Mar. 31, 2020

(54) MOLDED BODY AND MANUFACTURING METHOD THEREOF

(71) Applicant: Mitsubishi Gas Chemical Company, Inc., Tokyo (JP)

(72) Inventors: Kazuya Sato, Kanagawa (JP); Tomonori Kato, Kanagawa (JP); Mayumi Kikuchi, Kanagawa (JP); Masayuki Kobayashi, Kanagawa (JP)

(73) Assignee: Mitsubishi Gas Chemical Company, Inc., Tokyo (JP)

(*) Notice: Subject to any disclaimer, the term of this patent is extended or adjusted under 35 U.S.C. 154(b) by 439 days.

(21) Appl. No.: 15/302,896

(22) PCT Filed: Mar. 13, 2015

(86) PCT No.: PCT/JP2015/057597
§ 371 (c)(1),
(2) Date: Oct. 7, 2016

(87) PCT Pub. No.: WO2015/156086
PCT Pub. Date: Oct. 15, 2015

(65) Prior Publication Data
US 2017/0030494 A1 Feb. 2, 2017

(30) Foreign Application Priority Data
Apr. 10, 2014 (JP) .................. 2014-081426

(51) Int. Cl.
*B29B 7/00* (2006.01)
*B29C 47/00* (2006.01)
(Continued)

(52) U.S. Cl.
CPC .............. *F16L 11/04* (2013.01); *B29B 7/002* (2013.01); *B29C 48/022* (2019.02); *B29C 48/30* (2019.02);
(Continued)

(58) Field of Classification Search
CPC .......... C08L 77/00; C08L 77/02; C08L 77/04; C08L 77/06; C08L 77/08; C08L 77/10;
(Continued)

(56) References Cited

U.S. PATENT DOCUMENTS

2004/0126523 A1 7/2004 Masuda et al.
2004/0224112 A1 11/2004 Maruyama et al.
(Continued)

FOREIGN PATENT DOCUMENTS

CN 1550326 A 12/2004
EP 0015556 B1 7/1984
(Continued)

OTHER PUBLICATIONS

Wypych, George. Handbook of Polymers, ChemTec Publishing, 2016 (Year: 2016).*

(Continued)

*Primary Examiner* — Lee E Sanderson
(74) *Attorney, Agent, or Firm* — Fitch, Even, Tabin & Flannery LLP

(57) ABSTRACT

A molded article comprising a fuel-barrier layer formed of a resin composition comprising a polyamide resin (A) as a continuous phase and a resin (B) as a disperse phase, wherein (A) is a polyamide resin (A1) comprising at least one of a constituent unit derived from a lactam having 10 to 12 carbon atoms and a constituent unit derived from an aminocarboxylic acid having 10 to 12 carbon atoms, or a polyamide resin (A2) comprising a constituent unit derived from an aliphatic diamine having 6 to 12 carbon atoms and a constituent unit derived from an aliphatic dicarboxylic acid having 10 to 12 carbon atoms, the (B) is a resin selected from a semi-aromatic polyamide resin, the ratio by volume of (A)/(B) is 95/5 to 51/49, and the mean disperse particle diameter of (B) is 150 nm or more.

13 Claims, 1 Drawing Sheet

(51) Int. Cl.
  *B29C 47/20* (2006.01)
  *B29C 47/38* (2006.01)
  *F16L 11/04* (2006.01)
  *B29C 48/30* (2019.01)
  *B29C 48/32* (2019.01)
  *B29C 48/395* (2019.01)
  *F16L 9/12* (2006.01)
  *B29C 48/00* (2019.01)
  *B29C 48/09* (2019.01)
  *B29C 48/625* (2019.01)
  *B29K 77/00* (2006.01)
  *B29L 23/00* (2006.01)
  *B29L 31/24* (2006.01)

(52) U.S. Cl.
  CPC ............ *B29C 48/32* (2019.02); *B29C 48/397* (2019.02); *F16L 9/12* (2013.01); *B29C 48/09* (2019.02); *B29C 48/625* (2019.02); *B29K 2077/00* (2013.01); *B29K 2077/10* (2013.01); *B29K 2995/0069* (2013.01); *B29L 2023/005* (2013.01); *B29L 2023/22* (2013.01); *B29L 2031/24* (2013.01); *F16L 2011/047* (2013.01)

(58) Field of Classification Search
  CPC ..... C08L 2205/02; B29C 48/09; B29C 48/10; B29C 48/40; B29C 48/402; B29C 48/404; B29C 48/41; B29C 48/415; B29C 48/42; B29C 48/425; B29C 48/43; B29C 48/435; B29C 48/44; B29C 48/445; B29C 48/45; B29C 48/455; B29C 48/92; Y10T 428/13; Y10T 428/135; Y10T 428/139; B29K 2077/00; B29K 2077/10; B32B 27/06; B32B 27/08; B32B 27/34; B29L 2031/7172; F16L 11/04

USPC .......................... 428/35.7, 36.9, 36.91, 36.92
  See application file for complete search history.

(56) References Cited

U.S. PATENT DOCUMENTS

2005/0028845 A1    2/2005  Labib et al.
  2005/0288451 A1   12/2005  Liedloff et al.
  2008/0014397 A1    1/2008  Manai et al.
  2009/0269533 A1   10/2009  Sato et al.
  2013/0056107 A1    5/2013  Oyaizu et al.
  2013/0216751 A1*   8/2013  Mizutani ............. B29C 47/0004
                                                          428/36.9
  2014/0288229 A1*   9/2014  Sotokawa ................ C08K 7/06
                                                          524/538

FOREIGN PATENT DOCUMENTS

EP           2784122 A1    10/2014
  JP         04-198329 A      7/1992
  JP         05-156155 A      6/1993
  JP         10-230540 A      9/1998
  JP        2004-203012 A     7/2004
  JP         2008-18702 A     1/2008
  JP        2009-279927 A    12/2009
  JP        2012-122066 A     6/2012
  WO        2012/114634 A1    8/2012
  WO        2013/077238 A1    5/2013
  WO     WO-2013077238 A1  *  5/2013  ............... C08K 7/06

OTHER PUBLICATIONS

Wypych, George. Handbook of Polymers, ChemTec Publishing, 2016, pp. 228 & 283 (Year: 2016).*
  International Search Report dated Jun. 16, 2015 for PCT/JP2015/057597 and English translation of the same (5 pages).

* cited by examiner

MOLDED BODY AND MANUFACTURING METHOD THEREOF

CROSS-REFERENCE TO RELATED APPLICATIONS

This application is a U.S. national phase application filed under 35 U.S.C. § 371 of International Application No. PCT/JP2015/057597, filed Mar. 13, 2015, designating the United States, which claims priority from Japanese Application No. 2014-081426, filed Apr. 10, 2014, which are hereby incorporated herein by reference in their entirety.

FIELD OF THE INVENTION

The present invention relates to a molded article and a manufacturing method thereof.

BACKGROUND OF THE INVENTION

Heretofore, polyamide resins such as polyamide 11, polyamide 12 and the like are used in wide-range applications because of high chemical resistance thereof, and are, for example, widely used for various structures such as pipes, hoses, tubes, etc. Recently, from the viewpoint of prevention of environmental pollution, rigorous exhaust restrictions have been applied, and for example, the above-mentioned various structures for use for fuel oil have become desired to have high barrier properties for the purpose of preventing volatile components such as volatile hydrocarbons and the like from penetrating through the structures to be diffused out in air.

However, various structures formed of polyamide resins, especially polyamide 11 or polyamide 12 excellent in strength, toughness, chemical resistance and flexibility could not have sufficient barrier properties against volatile hydrocarbons and the like, and improvement thereof is desired. In addition, recently, an alcohol gasoline containing an alcohol such as methanol, ethanol or the like blended therein has been being put into practical use, but alcohol gasoline has high permeability and readily vaporizes in air, and therefore the barrier properties thereof need to be increased more.

As a means for enhancing the barrier properties, proposed is a multilayer structure that is provided with a barrier layer excellent in barrier properties in addition to a polyamide layer composed of polyamide 11 or polyamide 12.

For example, PTL 1 discloses a multilayer structure containing a polyamide layer composed of polyamide 11 and/or polyamide 12 and a barrier layer composed of polyamide 9T.

In addition, for example, PTL 2 describes a laminate having a thermoplastic resin composition layer containing different kinds of polyamide resins and a carbodiimide compound, and a polyamide resin layer composed of polyamide 11 and/or polyamide 12.

Further, for example, PTL 3 describes a tube having a barrier layer that contains a metaxylylene group-containing polyamide resin and a specific amount of a flexible resin miscible with the metaxylylene group-containing polyamide resin.

CITATION LIST

Patent Literature

PTL 1: JP-A 2004-203012
PTL 2: JP-A 2009-279927
PTL 3: JP-A 2008-18702

SUMMARY OF INVENTION

However, in the fuel tube formed of the multilayer structure or the laminate described in PTLs 1 and 2, as well as the tube described in PTL 3, the fuel-barrier layer needs to be formed of two or more layers in order to satisfy both fuel permeation resistance (barrier performance) and flexibility. The fuel-barrier layer having such a multilayer structure requires two or more extruders for kneading and extruding respective resins, and is therefore problematic in point of productivity.

The present invention has been made in consideration of the above-mentioned problems, and an object of the present invention is to provide a molded article excellent in flexibility and fuel permeation resistance in which the fuel-barrier layer may be a single layer, and to provide a production method for a molded article, which is excellent in productivity and which can produce a molded article excellent in flexibility and fuel permeation resistance.

The present inventors have assiduously studied and, as a result, have found that, when the fuel-barrier layer of a molded article contains a polyamide resin (A) having a hydrocarbon chain with 10 or more carbon atoms as a continuous phase and a resin (B) containing a semi-aromatic polyamide resin as a disperse phase, each in a specific ratio, in which the mean disperse particle diameter of the resin (B) is 150 nm or more, the molded article can satisfy both excellent flexibility and fuel permeation resistance even though the fuel-barrier layer is a single layer, and have completed the present invention described below.

The present invention relates to a molded article of each of the following (1) to (6) and a method for producing a molded article of each of the following (7) to (16).

(1) A molded article having a fuel-barrier layer formed of a resin composition that contains a polyamide resin (A) as a continuous phase and a resin (B) as a disperse phase, wherein:

the polyamide resin (A) is a polyamide resin (A1) containing at least one of a constituent unit derived from a lactam having 10 to 12 carbon atoms and a constituent unit derived from an aminocarboxylic acid having 10 to 12 carbon atoms, or a polyamide resin (A2) containing a constituent unit derived from an aliphatic diamine having 6 to 12 carbon atoms and a constituent unit derived from an aliphatic dicarboxylic acid having 10 to 12 carbon atoms, the resin (B) is a resin selected from a semi-aromatic polyamide resin, the ratio by volume of polyamide resin (A)/resin (B) is 95/5 to 51/49, and the mean disperse particle diameter of the resin (B) is 150 nm or more.

(2) The molded article according to the above (1), wherein the semi-aromatic polyamide resin is:

a polyamide resin (B1) in which 70 mol % or more of a diamine constituent unit is derived from metaxylylenediamine and 70 mol % or more of a dicarboxylic acid constituent unit is derived from an $\alpha,\omega$-linear aliphatic dicarboxylic acid having 4 to 8 carbon atoms, or a polyamide resin (B2) in which 70 mol % or more of a diamine constituent unit is derived from an aliphatic diamine having 9 to 12 carbon atoms and 70 mol % or more of a dicarboxylic acid constituent unit is derived from terephthalic acid.

(3) The molded article according to the above (1) or (2), wherein the polyamide resin (A) is one or more selected from the group consisting of polyamide 11, polyamide 12, polyamide 10,10, polyamide 10,12, polyamide 6,11 and polyamide 6,12.

(4) The molded article according to any one of the above (1) to (3), wherein the resin (B) is polymetaxylyleneadipamide.

(5) The molded article according to any one of the above (1) to (4), wherein the molded article is a tubular structure.

(6) The molded article according to the above (5), wherein the tubular structure is a fuel tube, a fuel pipe, a fuel hose or a connector.

(7) A method for producing a molded article having a fuel-barrier layer of a resin composition that contains a polyamide resin (A) as a continuous phase and a resin (B) as a disperse phase, from a polyamide resin (A) and a resin (B) using an extruder having a cylinder and a screw, wherein:

the extruder is a single-screw extruder, the polyamide resin (A) is a polyamide resin (A1) containing at least one of a constituent unit derived from a lactam having 10 to 12 carbon atoms and a constituent unit derived from an aminocarboxylic acid having 10 to 12 carbon atoms, or a polyamide resin (A2) containing a constituent unit derived from an aliphatic diamine having 6 to 12 carbon atoms and a constituent unit derived from an aliphatic dicarboxylic acid having 10 to 12 carbon atoms, the resin (B) is a resin selected from a semi-aromatic polyamide resin, the polyamide resin (A) and the resin (B) are dry-blended in such a range that the ratio by volume of polyamide resin (A)/resin (B) is 95/5 to 51/49, and the resulting resin composition containing the polyamide resin (A) and the resin (B) is extruded out through the single-screw extruder to form the fuel-barrier layer.

(8) The method for producing a molded article according to the above (7), wherein the semi-aromatic polyamide resin is:

a polyamide resin (B1) in which 70 mol % or more of a diamine constituent unit is derived from metaxylylenediamine and 70 mol % or more of a dicarboxylic acid constituent unit is derived from an α,ω-linear aliphatic dicarboxylic acid having 4 to 8 carbon atoms, or a polyamide resin (B2) in which 70 mol % or more of a diamine constituent unit is derived from an aliphatic diamine having 9 to 12 carbon atoms and 70 mol % or more of a dicarboxylic acid constituent unit is derived from terephthalic acid.

(9) The method for producing a molded article according to the above (7) or (8), wherein the polyamide resin (A) is one or more selected from the group consisting of polyamide 11, polyamide 12, polyamide 10,10, polyamide 10,12, polyamide 6,11 and polyamide 6,12.

(10) The method for producing a molded article according to any one of the above (7) to (9), wherein the resin (B) is polymetaxylyleneadipamide.

(11) The method for producing a molded article according to any one of the above (7) to (10), wherein the screw of the single-screw extruder is a full-flight screw.

(12) The method for producing a molded article according to any one of the above (7) to (11), wherein the ratio of the effective length L of the screw of the single-screw extruder to the diameter D of the screw thereof, L/D is 20 to 40.

(13) The method for producing a molded article according to any one of the above (7) to (12), wherein the screw of the single-screw extruder has a feeding zone and a metering zone and wherein the ratio of the cross section (F) of the screw in the feeding zone to the cross section (M) of the screw in the metering zone (F/M) is 2.0 to 3.5.

(14) The method for producing a molded article according to any one of the above (7) to (13), wherein the temperature of the cylinder of the single-screw extruder is in a range of from the melting point Tm of the resin (B) to the melting point Tm of the resin (B)+50° C.

(15) The method for producing a molded article according to any one of the above (7) to (14), wherein the molded article is a tubular structure.

(16) The method for producing a molded article according to the above (15), wherein the tubular structure is a fuel tube, a fuel pipe, a fuel hose or a connector.

The present invention can provide a molded article excellent in flexibility and fuel permeation resistance in which the fuel-barrier layer may be a single layer, and can provide a production method for a molded article, which is excellent in productivity and can produce a molded article excellent in flexibility and fuel permeation resistance.

DESCRIPTION OF EMBODIMENTS

Figure 1:
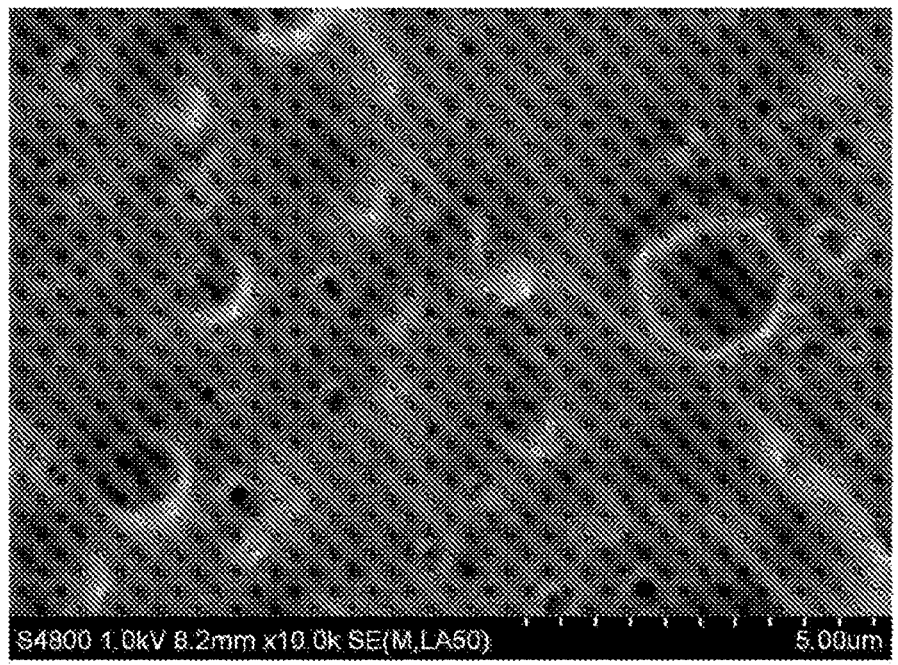
FIG. 1 is a SEM image showing a cross section of the tube obtained in Example 2.

The molded article of the present invention has a fuel-barrier layer formed of a resin composition that contains a polyamide resin (A) as a continuous phase and a resin (B) as a disperse phase, wherein the ratio by volume of polyamide resin (A)/resin (B) falls within a range of 95/5 to 51/49, and the mean disperse particle diameter of the resin (B) is 150 nm or more.

The polyamide resin (A) is, specifically, a polyamide resin (A1) containing at least one of a constituent unit derived from a lactam having 10 to 12 carbon atoms and a constituent unit derived from an aminocarboxylic acid having 10 to 12 carbon atoms, or a polyamide resin (A2) containing a constituent unit derived from an aliphatic diamine having 6 to 12 carbon atoms and a constituent unit derived from an aliphatic dicarboxylic acid having 10 to 12 carbon atoms.

The resin (B) is, specifically, a resin selected from a semi-aromatic polyamide resin.

The fuel-barrier layer having the constitution as above may be referred to as the fuel-barrier layer of the present invention.

The resin composition having the constitution as above may be referred to as the resin composition of the present invention.

The "fuel-barrier layer" means a layer having permeation resistance against a fuel such as alcohol, alcohol gasoline, etc. In the present invention, the wording "having permeation resistance against fuel" means that, in the case of using the following alcohol gasoline as a fuel, the permeability is 15 g/(m$^2$·day) or less in the fuel permeability evaluation mentioned below.

(Fuel Permeability Evaluation)

As a fuel, alcohol gasoline is prepared by mixing Fuel C (isooctane/toluene=50/50 by volume) and ethanol in a ratio by volume of Fuel C/ethanol=90/10.

A single-layer tube having a fuel-barrier layer of 1 mm thick and having an outer diameter of 8 mm and a length of 200 mm is prepared, and the prepared alcohol gasoline is put into the tube, then the other end of the tube is also airtightly sealed up to give a test tube. Subsequently, the mass of the test tube is measured, and then the test tube is put into an oven at 40° C. In 300 hours after having been put into the oven, the test tube is taken out, then the mass change is measured, and the alcohol gasoline permeation per m² is calculated.

Having the constitution as above, the molded article of the present invention satisfies both excellent flexibility and fuel permeation resistance even though the fuel barrier layer is a single layer. Although it is not sure, the reason could be considered as follows.

In general, the flexibility of a molded article could be realized by using a resin rich in flexibility such as polyamide 11, polyamide 12 or the like, as a resin to constitute the resin layer therein, or by reducing the thickness of the resin layer. However, in general, molecules that constitute a fuel (referred to as fuel molecules) may readily penetrate through the resin rich in flexibility. On the other hand, a resin that hardly allows penetration of fuel molecules therethrough (a fuel permeation-resistant resin) is generally hard, and when the thickness of the resin layer is reduced for realizing flexibility, the fuel permeation resistance of the layer may often lower.

Namely, flexibility and fuel permeation resistance are paradoxical to each other, and for imparting flexibility and fuel permeation resistance to a resin layer, it has been necessary to form a multilayer constitution that contains a flexible resin layer and a fuel permeation-resistant resin layer.

Moreover, even when a resin composition prepared by melt-kneading a flexible resin and a fuel permeation-resistant resin was used to form a fuel-barrier layer, the fuel permeation-resistant resin was finely dispersed to readily form resin particles having a small particle diameter, since the resin composition was generally well kneaded in a twin-screw extruder or the like. Accordingly, fuel molecules could easily permeate through the space between the particles of the fuel permeation-resistant resin, and a sufficient fuel permeation resistance could not be realized.

As opposed to this, it is considered that, in the fuel-barrier layer of the present invention, since the flexible polyamide resin (A) is made to be a continuous phase, the flexibility to the molded article is imparted; and since the mean disperse particle diameter of the resin (B) is large, the permeation channel of the fuel molecules that run between the resin particles should be long and the fuel permeation resistance can be therefore excellent.

For the fuel-barrier layer of the present invention, the polyamide resin (A) and the resin (B) are kneaded and extruded by a single-screw extruder, and therefore, it is considered that, as compared with the case where the resins are kneaded in a twin-screw extruder, the resin (B) can be kneaded under a mild condition and the mean disperse particle diameter of the resin (B) can be therefore kept large.

The polyamide resin (A) and the resin (B) are described in more detail hereinunder.

<Polyamide Resin (A)>

The polyamide resin (A) is a resin to form the continuous phase of the resin composition that constitutes the fuel-barrier layer of the present invention, and is a polyamide resin (A1) containing at least one of a constituent unit derived from a lactam having 10 to 12 carbon atoms and a constituent unit derived from an aminocarboxylic acid having 10 to 12 carbon atoms, or a polyamide resin (A2) containing a constituent unit derived from an aliphatic diamine having 6 to 12 carbon atoms and a constituent unit derived from an aliphatic dicarboxylic acid having 10 to 12 carbon atoms.

In the present invention, since the polyamide resin (A) contains the polyamide resin (A1) or the polyamide resin (A2) as the continuous phase of the resin composition constituting the fuel-barrier layer of the present invention, the flexibility of the molded article is bettered.

[Polyamide Resin (A1)]

The polyamide resin (A1) contains at least one of a constituent unit derived from a lactam having 10 to 12 carbon atoms and a constituent unit derived from an aminocarboxylic acid having 10 to 12 carbon atoms.

The carbon number of the lactam-derived constituent unit or the aminocarboxylic acid-derived constituent unit is preferably 11 to 12 from the viewpoint of flexibility and availability.

The constituent unit derived from a lactam having 10 to 12 carbon atoms or the constituent unit derived from an aminocarboxylic acid having 10 to 12 carbon atoms generally constitute an ω-aminocarboxylic acid unit represented by the following general formula (A-1).

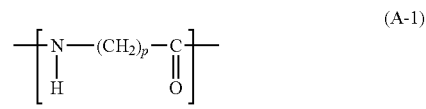

In the above formula, p indicates an integer of 9 to 11, and is preferably 10 to 11.

Specifically, as the compound that constitutes the constituent unit derived from a lactam having 10 to 12 carbon atoms, decanelactam, undecanelactam, and dodecanolactam can be exemplified. As the compound that constitutes the constituent unit derived from an aminocarboxylic acid having 10 to 12 carbon atoms, 10-aminodecanoic acid, 11-aminoundecanoic acid, and 12-aminododecanoic acid can be exemplified.

The polyamide resin (A1) is not limited to those consisting of the constituent unit selected from a constituent unit derived from a lactam having 10 to 12 carbon atoms and an aminocarboxylic acid having 10 to 12 carbon atoms, but may be those containing the constituent unit selected from these as the main component. Here, the wording "containing as the main component" is meant to allow the resin to contain any other constituent unit within a range not detracting from the advantageous effects of the present invention, and, though not specifically limited thereto, at least one of the constituent unit derived from a lactam having 10 to 12 carbon atoms and a constituent unit derived from an aminocarboxylic acid having 10 to 12 carbon atoms occupies a range of, for example, 60 mol % more, preferably 80 to 100 mol %, more preferably 90 to 100 mol % in terms of a monomer in the constituent units constituting the polyamide resin (A1).

Examples of the other constituent units in the polyamide resin (A1) include constituent units derived from lactams except for the lactam having 10 to 12 carbon atoms, from aminocarboxylic acids except for the aminocarboxylic acid having 10 to 12 carbon atoms, or from nylon salts formed of a diamine and a dicarboxylic acid.

Specifically, the lactams except for the lactam having 10 to 12 carbon atoms include three or more-membered ring lactams, and examples thereof include ε-caprolactam, ω-enantolactam, α-pyrrolidone, α-piperidone, etc. Examples of aminocarboxylic acids include 6-aminocaproic acid, 7-aminoheptanoic acid, 9-aminononanoic acid, etc.

Diamines that constitute the nylon salts include aliphatic diamines such as ethylenediamine, propylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, 1,13-tridecanediamine, 1,14-tetradecanediamine, 1,15-pentadecanediamine, 1,16-hexadecanediamine, 1,17-heptadecanediamine, 1,18-octadecanediamine, 1,19-nonadecanediamine, 1,20-eicosanediamine, 2-methyl-1,5-pentanediamine, 3-methyl-1,5-pentanediamine, 2-methyl-1,8-octanediamine, 2,2,4- or 2,4,4-trimethylhexanediamine, etc.; alicyclic diamines such as 1,3- or 1,4-cyclohexanediamine, 1,3- or 1,4-bis(aminomethyl)cyclohexane, bis(4-aminocyclohexyl)methane, 2,2-bis(4-aminocyclohexyl)propane, bis(3-methyl-4-aminocyclohexyl)methane, 2,2-bis(3-methyl-4-aminocyclohexyl)propane, 5-amino-2,2,4-trimethylcyclopentanemethanamine, 5-amino-1,3,3-trimethylcyclohexanemethanamine, bis(aminopropyl)piperazine, bis(aminoethyl)piperazine, norbornanedimethylamine, tricyclodecanedimethylamine, etc.; aromatic ring-containing diamines such as paraxylylenediamine, metaxylylenediamine, etc.

Dicarboxylic acids that constitute the nylon salts includes aliphatic dicarboxylic acids such as adipic acid, pimelic acid, suberic acid, azelaic acid, sebacic acid, 1,9-nonanedicarboxylic acid, 1,10-decanedicarboxylic acid, 1,11-undecanedicarboxylic acid, 1,12-dodecanedicarboxylic acid, etc.; alicyclic dicarboxylic acids such as 1,3- or 1,4-cyclohexanedicarboxylic acid, dicyclohexanemethane-4,4'-dicarboxylic acid, norbornanedicarboxylic acid, etc.; aromatic dicarboxylic acids such as isophthalic acid, terephthalic acid, 1,4-, 2,6- or 2,7-naphthalenedicarboxylic acid, etc.

As the polyamide resin (A1), preferred is polyamide 11, which has, as the main component, at least one of a constituent unit derived from undecanelactam and a constituent unit derived from 11-aminoundecanoic acid, or polyamide 12, which has, as the main component, at least one of a constituent unit derived from dodecanolactam and a constituent unit derived from 12-aminododecanoic acid, or a mixture of these polyamide 11 and polyamide 12.

[Polyamide Resin (A2)]

The polyamide resin (A2) contains a constituent unit derived from an aliphatic diamine having 6 to 12 carbon atoms and a constituent unit derived from an aliphatic dicarboxylic acid having 10 to 12 carbon atoms.

The compound capable of constituting the diamine unit of the polyamide resin (A2) is an aliphatic diamine having 6 to 12 carbon atoms. The aliphatic group of the aliphatic diamine having 6 to 12 carbon atoms is a linear or branched, divalent aliphatic hydrocarbon group, and may be a saturated aliphatic group or an unsaturated aliphatic group, but in general, the group is a linear saturated aliphatic group. The carbon number of the aliphatic group is preferably 8 to 12, more preferably 9 to 12, even more preferably 10 to 12.

The compound capable of constituting the diamine unit of the polyamide resin (A2) includes, though not limited thereto, aliphatic diamines such as hexamethylenediamine, heptamethylenediamine, octamethylenediamine, nonamethylenediamine, decamethylenediamine, undecamethylenediamine, dodecamethylenediamine, etc. One alone or two or more of these may be used either singly or as combined.

The diamine unit in the polyamide resin (A2) contains a constituent unit derived from the aliphatic diamine having 6 to 12 carbon atoms in an amount of 70 mol % or more, preferably 80 to 100 mol %, more preferably 90 to 100 mol %, from the viewpoint of flexibility, etc.

In that manner, the diamine unit in the polyamide resin (A2) may consist of the constituent unit derived from an aliphatic diamine having 6 to 12 carbon atoms alone, but may contain any other constituent units derived from other diamines than an aliphatic diamine having 6 to 12 carbon atoms.

In the polyamide resin (A2), examples of the other diamines than an aliphatic diamine having 6 to 12 carbon atoms include, though not limited thereto, ethylenediamine, propylenediamine, tetramethylenediamine, pentamethylenediamine; alicyclic diamines such as 1,3- or 1,4-bis(aminomethyl)cyclohexane, 1,3- or 1,4-diaminocyclohexane, bis(4-aminocyclohexyl)methane, 2,2-bis(4-aminocyclohexyl)propane, bis(aminomethyl)decalin, bis(aminomethyl)tricyclodecane, etc.; aromatic ring-containing diamines such as bis(4-aminophenyl) ether, paraphenylenediamine, bis(aminomethyl)naphthalene, etc.

The compound capable of constituting the dicarboxylic acid unit in the polyamide resin (A2) is an aliphatic dicarboxylic acid having 10 to 12 carbon atoms, and examples thereof include sebacic acid, 1,9-nonanedicarboxylic acid, 1,10-decanedicarboxylic acid, etc. One alone or two or more of these may be used either singly or as combined.

The dicarboxylic acid unit in the polyamide resin (A2) contains the constituent unit derived from the aliphatic dicarboxylic acid having 10 to 12 carbon atoms in an amount of 70 mol % or more, preferably 80 to 100 mol %, more preferably 90 to 100 mol %, from the viewpoint of further bettering flexibility.

In that manner, the dicarboxylic acid unit in the polyamide resin (A2) may consist of the constituent unit derived from the aliphatic dicarboxylic acid having 10 to 12 carbon atoms alone, but may contain any other constituent units derived from other dicarboxylic acids than an aliphatic dicarboxylic acid having 10 to 12 carbon atoms.

In the polyamide resin (A2), examples of the other dicarboxylic acids than an aliphatic dicarboxylic acid having 10 to 12 carbon atoms include, though not limited thereto, aliphatic dicarboxylic acid having 9 or less or 13 or more carbon atoms such as succinic acid, glutaric acid, adipic acid, pimelic acid, suberic acid, azelaic acid, 1,11-undecanedicarboxylic acid, 1,12-dodecanedicarboxylic acid, 1,13-tridecanedicarboxylic acid, 1,14-tetradecanedicarboxylic acid, etc.; aromatic dicarboxylic acids such as terephthalic acid, isophthalic acid, 2,6-naphthalenedicarboxylic acid, etc.

From the viewpoint of bettering flexibility, the polyamide resin (A2) is preferably a polyamide that contains, as the main component of the diamine constituent unit therein, a constituent unit derived from an aliphatic diamine having 10 or more carbon atoms, and examples thereof include polyamide 10,10, polyamide 10,12, polyamide 6,11, and polyamide 6,12. More preferred is polyamide 10,10, which contains, as the main components, a constituent unit derived from an aliphatic diamine having 10 carbon atoms and a constituent unit derived from an aliphatic dicarboxylic acid having 10 carbon atoms; polyamide 10,12, which contains, as the main components, a constituent unit derived from an aliphatic diamine having 10 carbon atoms and a constituent unit derived from an aliphatic dicarboxylic acid having 12 carbon atoms; or a mixture of these.

Among the above, the polyamide resin (A) is preferably one or more selected from the group consisting of polyamide 11, polyamide 12, polyamide 10,10, polyamide 10,12, polyamide 6,11 and polyamide 6,12, more preferably at least one of polyamide 11 and polyamide 12.

[Production Method for Polyamide Resin (A1) and Polyamide Resin (A2)]

The polyamide resin (A1) can be obtained by polymerizing the above-mentioned constitutive monomers, and, for example, can be obtained by ring-opening polymerization of lactams or by polycondensation of aminocarboxylic acids.

The polymerization method is not specifically limited, and known methods such as melt polymerization, solution polymerization, solid-phase polymerization or the like can be employed. These polymerization methods can be used either singly or as suitably combined. As the production apparatus, usable is any known polyamide production apparatus including a batch-type reactor, a single-tank or multi-tank continuous reaction apparatus, a tubular continuous reaction apparatus, a kneading reaction extruder such as a single-screw kneading extruder, a twin-screw kneading extruder or the like.

The polyamide resin (A2) can be obtained by polycondensation of a diamine component and a dicarboxylic acid component. For example, the polyamide resin can be produced by a method in which a salt composed of a diamine component and a dicarboxylic acid component is heated under pressure in the presence of water, such that the components are polymerized in a molten state while removing the added water and the condensation water. Alternatively, the polyamide resin can be produced by a method in which a diamine component is directly added to a dicarboxylic acid component being in a molten state and they are polycondensed under normal pressure. In this case, for the purpose of keeping the reaction system in a uniform liquid state, the diamine component is continuously added to a dicarboxylic acid component, and during this period the reaction system is heated such that the reaction temperature is not be lower than the melting points of the oligoamide and the polyamide being produced, thereby developing the polycondensation.

During polycondensation for the polyamide resin (A1) and the polyamide resin (A2), a small amount of a monoamine, a monocarboxylic acid or the like may be added as a molecular weight regulator.

Further, during polycondensation for the polyamide resin (A1) and the polyamide resin (A2), any known additive such as a phosphorus atom-containing compound, an alkali metal compound, an alkaline earth metal compound or the like may be added, for the purpose of obtaining the effect of accelerating the amidation reaction and the effect of preventing discoloration during polycondensation.

<Resin (B)>

The resin (B) is a resin to form the disperse phase in the resin composition that constitutes the molded article of the present invention and is a resin selected from a semi-aromatic polyamide resin.

The resin composition of the present invention contains the resin (B) as a disperse phase and the mean disperse particle diameter of the resin (B) is 150 nm or more, by which the fuel permeation resistance of the molded article can be bettered.

[Semi-Aromatic Polyamide Resin]

The semi-aromatic polyamide resin is a resin in which any one of the diamine constituent unit and the dicarboxylic acid constituent unit contains a constituent unit derived from an aromatic compound in an amount of more than 50 mol %.

The examples of the resin include a polyamide resin in which more than 50 mol % of the diamine constituent unit is a constituent unit derived from a xylylenediamine and more than 50 mol % of the dicarboxylic acid constituent unit is a constituent unit derived from a nonaromatic dicarboxylic acid; a polyamide resin in which more than 50 mol % of the diamine constituent unit is a constituent unit derived from a nonaromatic diamine and more than 50 mol % of the dicarboxylic acid constituent unit is a constituent unit derived from a phthalic acid; etc.

From the viewpoint of further bettering the fuel permeation resistance of the molded article, it is preferable that the semi-aromatic polyamide resin is a polyamide resin (B1) in which 70 mol % or more of a diamine constituent unit is derived from metaxylylenediamine and 70 mol % or more of a dicarboxylic acid constituent unit is derived from an α,ω-linear aliphatic dicarboxylic acid having 4 to 8 carbon atoms, or a polyamide resin (B2) in which 70 mol % or more of a diamine constituent unit is derived from an aliphatic diamine having 9 to 12 carbon atoms and 70 mol % or more of a dicarboxylic acid constituent unit is derived from terephthalic acid.

The polyamide resin (B1) and the polyamide resin (B2) are described in more detail hereinunder.

[Polyamide Resin (B1)]

The polyamide resin (B1) contains constituent units in which 70 mol % or more of the diamine constituent unit is derived from metaxylylenediamine and 70 mol % or more of the dicarboxylic acid constituent unit is derived from an α,ω-linear aliphatic dicarboxylic acid having 4 to 8 carbon atoms.

The diamine unit in the polyamide resin (B1) includes, from the viewpoint of suitably exhibiting the fuel permeation resistance and the thermal properties such as the glass transition temperature and the melting point, a constituent unit derived from metaxylylenediamine in an amount of 70 mol % or more, preferably 80 to 100 mol %, more preferably 90 to 100 mol %.

The diamine unit in the polyamide resin (B1) may consist of metaxylylenediamine-derived constituent unit alone, but may contain a constituent unit derived from any other diamine than a metaxylylenediamine.

Examples of the compound that constitutes the diamine constituent unit except for metaxylylenediamine include, though not limited thereto, aliphatic diamines such as tetramethylenediamine, pentamethylenediamine, 2-methyl-1,5-pentanediamine, hexamethylenediamine, heptamethylenediamine, octamethylenediamine, nonamethylenediamine, decamethylenediamine, dodecamethylenediamine, 2,2,4- or 2,4,4-trimethylhexamethylenediamine, etc.; alicyclic diamines such as 1,3- or 1,4-bis(aminomethyl)cyclohexane, 1,3- or 1,4-diaminocyclohexane, bis(4-aminocyclohexyl)methane, 2,2-bis(4-aminocyclohexyl)propane, bis(aminomethyl)decalin, bis(aminomethyl)tricyclodecane, etc.; aromatic ring-containing diamines such as bis(4-aminophenyl) ether, paraphenylenediamine, paraxylylenediamine, bis(aminomethyl)naphthalene, etc.

The compound capable of constituting the aliphatic dicarboxylic acid unit having 4 to 8 carbon atoms in the polyamide resin (B1) includes an α,ω-linear aliphatic dicarboxylic acid having 4 to 8 carbon atoms. The α,ω-linear aliphatic dicarboxylic acid having 4 to 8 carbon atoms includes succinic acid, glutaric acid, adipic acid, pimelic acid and suberic acid. From the viewpoint of the fuel permeation resistance of the molded article and availability, adipic acid is preferred.

The dicarboxylic acid unit in the polyamide resin (B1) includes, from the viewpoint of suitably exhibiting the fuel permeation resistance and the thermal properties such as the glass transition temperature and the melting point of the molded article, a constituent unit derived from an aliphatic dicarboxylic acid having from 4 to 8 carbon atoms in an amount of 70 mol % or more, preferably 80 to 100 mol %, more preferably 90 to 100 mol %.

In that manner, the dicarboxylic acid unit in the polyamide resin (B1) may consist of the constituent unit derived from an aliphatic dicarboxylic acid having from 4 to 8 carbon atoms alone, but may contain a constituent unit derived from any other dicarboxylic acid than an aliphatic dicarboxylic acid having from 4 to 8 carbon atoms.

In the polyamide resin (B1), examples of the other dicarboxylic acid than an aliphatic dicarboxylic acid having from 4 to 8 carbon atoms include aliphatic dicarboxylic acids having 3 or less carbon atoms such as oxalic acid, malonic acid, etc.; aliphatic dicarboxylic acids having 9 or more carbon atoms such as azelaic acid, sebacic acid, 1,9-nonanedicarboxylic acid, 1,10-decanedicarboxylic acid, etc.; aromatic dicarboxylic acids such as terephthalic acid, isophthalic acid, 2,6-naphthalenedicarboxylic acid, etc., but the dicarboxylic acid is not limited thereto. One or more of these may be used singly or as combined.

In the present invention, the polyamide resin (B1) is most preferably polymetaxylyleneadipamide (MXD6) where all the diamine units are metaxylylenediamine-derived constituent units and all the dicarboxylic acid units are adipic acid-derived constituent units.

The melting point Tm of the polyamide resin (B1) is, from the viewpoint of heat resistance and melt moldability, preferably in a range of 200 to 245° C., more preferably 220 to 240° C.

The melting point of the polyamide resin (B1) is measured using a differential scanning calorimeter [manufactured by Shimadzu Corporation, trade name: DSC-60] in a mode of DSC measurement (differential scanning calorimetry) at a heating rate of 10° C./min in a nitrogen stream atmosphere.

[Polyamide Resin (B2)]

The polyamide resin (B2) contains constituent units in which 70 mol % or more of the diamine constituent unit is derived from an aliphatic diamine having 9 to 12 carbon atoms and 70 mol % or more of the dicarboxylic acid constituent unit is derived from terephthalic acid.

The compound capable of constituting the diamine unit in the polyamide resin (B2) is an aliphatic diamine having 9 to 12 carbon atoms. The aliphatic group of the aliphatic diamine having 9 to 12 carbon atoms is a linear or branched divalent aliphatic hydrocarbon group, and may be a saturated aliphatic group or an unsaturated aliphatic group, but is generally a linear saturated aliphatic group.

Examples of the aliphatic diamine having 9 to 12 carbon atoms include nonamethylenediamine, 2,2,4- or 2,4,4-trimethylhexamethylenediamine, decamethylenediamine, undecamethylenediamine, dodecamethylenediamine, etc.

The diamine unit in the polyamide resin (B2) includes, from the viewpoint of maintaining good fuel permeation resistance, a constituent unit derived from an aliphatic diamine having 9 to 12 carbon atoms in an amount of 70 mol % or more, preferably from 80 to 100 mol %, more preferably from 90 to 100 mol %.

In that manner, the diamine unit in the polyamide resin (B2) may consist of the constituent unit derived from an aliphatic diamine having 9 to 12 carbon atoms alone, but may contain a constituent unit derived from any other diamine than an aliphatic diamine having 9 to 12 carbon atoms.

In the polyamide resin (B2), examples of the other diamine than an aliphatic diamine having 9 to 12 carbon atoms include aliphatic diamines having 8 or less carbon atoms such as tetramethylenediamine, pentanediamine, 2-methyl-1,5-pentanediamine, hexamethylenediamine, heptamethylenediamine, octamethylenediamine, etc.; alicyclic diamines such as 1,3- or 1,4-bis(aminomethyl) cyclohexane, 1,3- or 1,4-diaminocyclohexane, bis(4-aminocyclohexyl)methane, 2,2-bis(4-aminocyclohexyl)propane, bis(aminomethyl)decalin, bis(aminomethyl)tricyclodecane, etc.; aromatic ring-containing diamines such as bis(4-aminophenyl) ether, paraphenylenediamine, bis(aminomethyl) naphthalene, etc., but the diamine is not limited thereto.

The compound capable of constituting the dicarboxylic acid unit in the polyamide resin (B2) is terephthalic acid, and from the viewpoint of more bettering fuel permeation resistance, the resin contains terephthalic acid-derived constituent unit in an amount of 70 mol % or more, preferably 80 to 100 mol %, more preferably 90 to 100 mol %.

In that manner, the dicarboxylic acid unit in the polyamide resin (B2) may consist of a constituent unit derived from terephthalic acid alone, but may include a constituent unit derived from any other dicarboxylic acid than terephthalic acid.

In the polyamide resin (B2), examples of the other dicarboxylic acid than terephthalic acid include aliphatic carboxylic acids such as succinic acid, glutaric acid, adipic acid, pimelic acid, suberic acid, azelaic acid, sebacic acid, 1,9-nonanedicarboxylic acid, 1,10-decanedicarboxylic acid, 1,11-undecanedicarboxylic acid, 1,12-dodecanedicarboxylic acid, 1,13-tridecanedicarboxylic acid, 1,14-tetradecanedicarboxylic acid, etc.; aromatic dicarboxylic acids except for terephthalic acid such as isophthalic acid, 2,6-naphthalenedicarboxylic acid, etc., but the dicarboxylic acid is not limited thereto.

The polyamide resin (B2) is preferably polyamide 9T (PA9T), which contains, as the main components, a nonamethylenediamine-derived constituent unit and a terephthalic acid-derived constituent, respectively.

The melting point Tm of the polyamide resin (B2) is, from the viewpoint of heat resistance and melt moldability, preferably 250 to 315° C., more preferably 260 to 300° C., even more preferably 260 to 280° C.

The melting point of the polyamide resin (B2) is measured in the same manner as that for the polyamide resin (B1).

Among the above, the resin (B) is preferably any one selected from the group consisting of polymetaxylyleneadipamide (MXD6) and polyamide 9T (PA9T), and polymetaxylyleneadipamide (MXD6) is more preferred.

[Production Method for Resin (B)]

The polyamide resin (B1) and the polyamide resin (B2) can be produced through polycondensation of a diamine component and a dicarboxylic acid component. The production method is the same as that for the polyamide resin (A2).

<Resin Composition>

The resin composition to constitute the molded article of the present invention contains the polyamide resin (A) as a continuous phase and the resin (B) as a disperse phase, wherein the ratio by volume of polyamide resin (A)/resin (B) falls within a range of 95/5 to 51/49. The mean disperse particle diameter of the resin (B) is 150 nm or more.

The mean disperse particle diameter of the resin (B) can be measured by observing the cross section of the molded article with SEM (scanning electron microscope). More specifically, the molded article is cut with a microtome to give a sample piece, and the sample piece is immersed in an aqueous solution of 10 mass % phosphotungstic acid for 8 hours in an 80° C. ambience. Subsequently, the cross section of the sample piece is observed with SEM at a magnification of 10,000 times, and the image of the observed cross section is subjected to image processing to calculate the mean disperse particle diameter of the resin (B). The image processing is carried out, for example, using "WinROOF" manufactured by Mitani Corporation.

The upper limit of the mean disperse particle diameter of the resin (B) is not specifically limited so far as the resin (B) forms a disperse phase, but is approximately 3,000 nm. The mean disperse particle diameter of the resin (B) is, from the viewpoint of the fuel permeation resistance of the molded article, preferably 350 nm or more, more preferably 450 nm or more, even more preferably 550 nm or more. In turn, the mean disperse particle diameter of the resin (B) is, from the viewpoint of the flexibility of the molded article, preferably 2,500 nm or less, more preferably 1500 nm or less, even more preferably 1,200 nm or less.

In the resin composition of the present invention, the ratio by volume of polyamide resin (A)/resin (B) is, from the viewpoint of satisfying both the flexibility and the fuel permeation resistance of the molded article, preferably 92/8 to 53/47, more preferably 92/8 to 63/37, even more preferably 84/16 to 72/28.

The resin composition of the present invention may contain various additives in addition to the polyamide resin (A) and the resin (B). The additives include plasticizers such as benzenesulfonic acid alkylamides, toluenesulfonic acid alkylamides, alkyl hydroxybenzoates, etc.; impact modifiers such as rubber-like polymers, etc.; conductive fillers exemplified by carbon black, graphite, metal-containing fillers, etc.; antioxidants, heat stabilizers, UV absorbents, light stabilizers, lubricants, inorganic fillers, antistatic agents, flame retardants, crystallization accelerators, etc.

[Preparation of Resin Composition]

The resin composition of the present invention can be prepared by mixing the polyamide resin (A) and the resin (B) and the various additives that are contained if necessary to give a resin mixture, and then melt-kneading the resin mixture through an extruder. One kind or a mixture of two or more kinds may be used for each of the polyamide resin (A) and the resin (B).

At this time, the mass of the polyamide resin (A) and the resin (B) is individually metered in consideration of the specific gravity thereof, and these are so mixed that the ratio by volume of polyamide resin (A)/resin (B) could be 95/5 to 51/49.

Depending on the specific gravity of each resin, the polyamide resin (A) and the resin (B) may be so mixed that the ratio by mass of polyamide resin (A)/resin (B) could fall within a range of 94/6 to 46/54 approximately, thereby giving the resin composition where the ratio by mass of the two is 95/5 to 51/49.

The specific gravity of the polyamide resin (A) and the resin (B) can be measured, for example, according to the method of JIS K 7112 (1999).

<Configuration of Molded Article and Production Method for Molded Article>

In the present invention, the fuel-barrier layer can be a single layer, but the molded article may have a multilayer structure to be formed by layering the fuel-barrier layer and any other layer (for example, color layer, functional layer such as UV absorbing layer, etc.).

In the case where the molded article of the present invention has a plurality of other layers, the plural layers may be the same or different.

The molded article of the present invention is preferably a tubular structure. The tubular structure is a structure having a hollow part in the tubular in which a fuel as a fluent material such as a liquid, a vapor or the like may be moved from one end to the other end in the hollow part. The specific examples of the tubular structure include a fuel pipe, a fuel hose, a fuel tube, and in addition, connectors capable of connecting these.

In the case where the molded article is a multilayer tubular structure, it is preferable, from the viewpoint of fuel permeation resistance, chemical resistance and the like, that the fuel-barrier layer of the present invention is positioned on the hollow part side of the tubular structure, that is, the inner side of the tubular structure.

The thickness of the molded article of the present invention may be suitably defined depending on the use thereof, but from the viewpoint of fuel permeation resistance and flexibility, the thickness of the molded article is preferably 0.01 to 10 mm, more preferably 0.1 to 5 mm.

The fuel applicable to the molded article of the present invention is not specifically limited, and examples thereof include alkanes such as hexane, octane, etc.; aromatic compounds such as toluene, benzene, etc.; alcohols such as methanol, ethanol, etc.; alcohol gasoline prepared by mixing isooctane, toluene and alcohol, etc. Above all, the molded article is excellent in permeation resistance against alcohol gasoline.

The molded article of the present invention is, from the viewpoint of adjusting the mean disperse particle diameter of the resin (B) contained in the fuel-barrier layer of the present invention to 150 nm or more, produced according to the following method.

Specifically, the production method for the molded article of the present invention is a method for producing a molded article having a fuel-barrier layer of a resin composition that contains the polyamide resin (A) as the continuous phase and the resin (B) as the disperse phase, from the polyamide resin (A) and the resin (B) using an extruder having a cylinder and a screw, wherein:

the extruder is a single-screw extruder, the polyamide resin (A) is the polyamide resin (A1) containing at least one of the constituent unit derived from the lactam having 10 to 12 carbon atoms and the constituent unit derived from the aminocarboxylic acid having 10 to 12 carbon atoms, or the polyamide resin (A2) containing the constituent unit derived from the aliphatic diamine having 6 to 12 carbon atoms and the constituent unit derived from the aliphatic dicarboxylic acid having 10 to 12 carbon atoms, the resin (B) is the resin selected from the semi-aromatic polyamide resin, the polyamide resin (A) and the resin (B) are dry-blended in such a range that the ratio by volume of polyamide resin (A)/resin (B) is 95/5 to 51/49, and the resulting resin composition containing the polyamide resin (A) and the resin (B) is extruded out through the single-screw extruder to form the fuel-barrier layer.

According to the method having the constitution as above, the polyamide resin (A) and the resin (B) are mixed, and extruded out through a single-screw extruder to form the fuel barrier layer of the resin composition that contains the polyamide resin (A) as the continuous phase and the resin (B) as the disperse phase, in which the mean disperse particle diameter of the resin (B) is 150 nm or more.

Preferred constitutions of the single-screw extruder for use in the production method for the molded article of the present invention and preferred extrusion conditions are described below.

[Single-Screw Extruder]

The extruder for use in the production method for the molded article of the present invention is a single-screw extruder having a cylinder and a screw inserted through the inside of the cylinder.

The polyamide resin (A) and the resin (B) are kneaded in the single-screw extruder and extruded out therefrom, whereby the resin (B) can be prevented from being finely dispersed and the mean disperse particle diameter thereof can be 150 nm or more. In addition, even though the fuel-barrier layer is a single layer the molded article is excellent in fuel permeation resistance and flexibility, and therefore, only one single-screw extruder is enough for the extruder for use in formation of the fuel-barrier layer of the molded article.

The screw that the single-screw extruder has is, from the viewpoint of preventing the resin (B) from being finely dispersed and preventing the resin composition of the present invention from thickening, preferably a full-flight screw which does not have a kneading part such as a Maddock-type kneading part or the like.

The screw has a threading part formed spirally on the side surface of the screw shaft, and the outer diameter of the threading part is somewhat smaller than the inner diameter of the inner peripheral surface of the cylinder, and is set to be constant.

The screw is generally composed of a feeding zone, a compression zone and a metering zone. The feeding zone refers to the range of threading of the screw in which the threading depth (that may be referred to as height or screw depth) is kept constant from the start of the threading. The compression zone refers to the range where the threading depth gradually decreases. The metering zone refers to the range where the threading depth at the tip of the screw is small and is constant.

The ratio of the cross section (F) of the screw in the feeding zone to the cross section (M) of the screw in the metering zone (F/M) is referred to as a compression ratio of the screw. In the present invention, the compression ratio of the screw of the single-screw extruder is, from the viewpoint of preventing the resin (B), from being finely dispersed, preferably 2.0 to 3.5, more preferably 2.5 to 3.5.

When the compression ratio of the screw is 2.0 or more, a shear effect can be effectively given to the resin composition of the present invention, and the other components than the resin (B) can be thereby sufficiently plasticized. In turn, when the compression ratio is 3.5 or less, the resin (B) in the resin composition of the present invention can be prevented from being dispersed into fine particles in the single-screw extruder.

Regarding the shape of the screw, the ratio of the effective length L of the screw to the diameter D (outer diameter of the threading part) of the screw, L/D, is, from the viewpoint of preventing the resin (B) from being finely dispersed, preferably 20 to 40, more preferably 24 to 36.

On the single-screw extruder, any or all of the parts corresponding to the feeding zone, the compression zone and the metering zone of the screw may be equipped with a heater, which heats a part of the cylinder corresponding to the feeding zone, the compression zone and the metering zone so that the cylinder temperature can be controlled.

The temperature of the cylinder of the single-screw extruder is, from the viewpoint of preventing the resin composition of the present invention from thickening, preferably in a range of from the melting point Tm of the resin (B) to the melting point Tm of the resin (B)+50° C., more preferably in a range of from the melting point Tm+5° C. to the melting point Tm+40° C.

In the case where the resin composition of the present invention contains two or more kinds of the resins (B), the cylinder temperature is based on the melting point of the resin having the highest melting point among all the resins (B).

EXAMPLES

The present invention is described in more detail with reference to Examples hereinunder, but the present invention is not limited thereto. In those Examples, various measurements were carried out according to the following methods.

(1) Mean Disperse Particle Diameter of Resin (B)

The tubes obtained in Examples 1 to 11 and Comparative Examples 3 and 4 each were cut with a microtome in the direction vertical to the length direction thereof to give test pieces. The test pieces were immersed in an aqueous solution of 10 mass % phosphotungstic acid for 8 hours in an 80° C. ambience. Subsequently, the cross section of the sample piece was observed with SEM at a magnification of 10,000 times, and the image of the observed cross section was subjected to image processing to calculate the mean disperse particle diameter of the resin (B).

The image processing method is as follows. Using "Win-ROOF" manufactured by Mitani Corporation, the SEM observation image was binarized, the domain of the resin (B) alone was mechanically extracted on the image, and the arithmetic mean value of the measured circle-corresponding diameters was employed as the disperse particle diameter of the resin (B).

Figure 2:
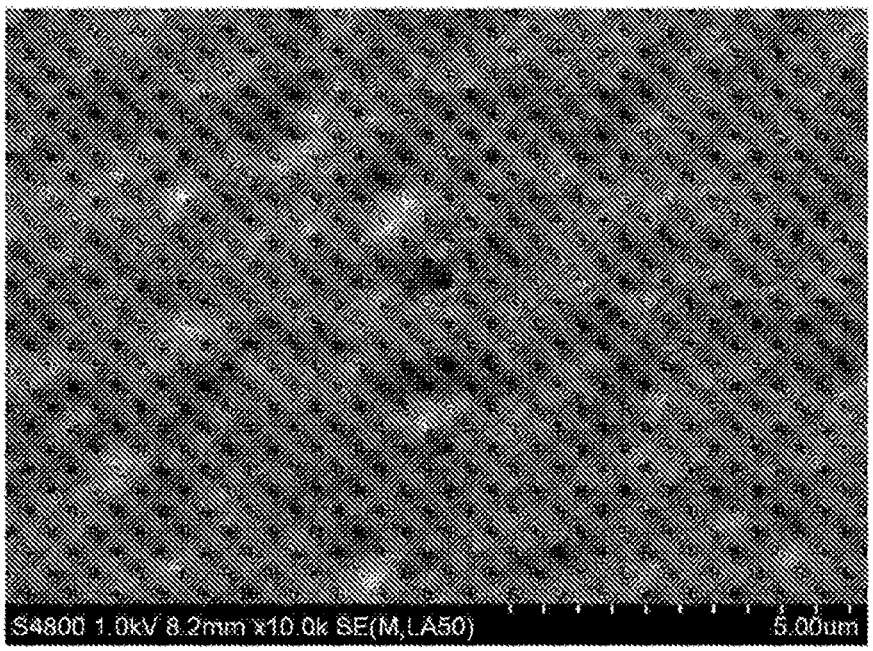
FIG. 2 is a SEM image showing a cross section of the tube obtained in Comparative Example 3.

The obtained results are shown in Tables 1 and 2. In Comparative Example 4, however, the resin (B) did not form a disperse phase, and the result was expressed as "-" in Tables 1 and 2. The observation results of the cross section of the tubes obtained in Example 2 and Comparative Example 3 are shown in FIG. 1 and FIG. 2, respectively.

(2) Flexibility Evaluation

The tubes obtained in Examples, Comparative Examples and Reference Examples each were cut into 100 mm, and then cut in the direction parallel to the length direction of the tube to give test pieces having a width of 10 mm and a length of 100 mm. The resultant test pieces were tested in a tensile test at a pulling rate of 50 mm/min in the length direction of the test piece, thereby measuring the tensile elastic modulus and the tensile elongation thereof.

The samples whose tensile elastic modulus was 1,500 MPa or less and whose tensile elongation was 350% or more were rated as good (G), while those not satisfying any one or both of the two were rated as poor (P). The results are shown in Tables 1 and 2.

(3) Alcohol Gasoline Permeation Resistance Evaluation

The tubes obtained in Examples, Comparative Examples and Reference Examples each were cut into 200 mm, and one end of the cut tube was sealed up. Next, an alcohol gasoline prepared by mixing Fuel C (isooctane/toluene=50/50 by volume) and ethanol in a ratio by volume of Fuel C/ethanol=90/10 was put into the tube, and the other end of the tube was also sealed up to prepare a test tube. Subsequently, the mass of the test tube was measured, and then the test tube was put in an oven at 40° C. In 300 hours after having been put into the oven, the test tube was taken out, and the mass change was measured, from which the alcohol gasoline permeability per $m^2$ was evaluated.

The tubes whose permeability was 15 g/(m²·day) or less were rated as good (G), while the tubes whose permeability was more than 15 g/(m²·day) were rated as poor (P). The results are shown in Tables 1 and 2.

<Resins>

Resins used in Examples 1 to 11, Comparative Examples 1 to 4 and Reference Examples 1 and 2 are as follows.

1. Polyamide resin (A)
1) Polyamide 11 [PA11; polyamide resin (A1)]
Manufactured by Arkema K.K., Rilsan (registered trademark) BESN P20 TL, density: 1.04 g/cm³
2) Polyamide 12 [PA12; polyamide resin (A1)]
Manufactured by Ube Industries, Ltd., UBESTA (registered trademark) 3030U, density: 1.02 g/cm³
3) Polyamide 10,10 [PA1010; polyamide resin (A2)]
Manufactured by Arkema K.K., Rilsan (registered trademark) TESN P413 TL, density: 1.04 g/cm³
2. Resin (B)
1) Polymetaxylyleneadipamide [MXD6; polyamide resin (B1)]
Resin obtained according to the following production method.
2) Polyamide 9T [PA9T; polyamide resin (B2)]
Manufactured by Kuraray Co., Ltd., Genestar (registered trademark) N1001D, melting point: 262° C., density: 1.10 g/cm³

[Production of polymetaxylyleneadipamide (MXD6)]

In a reaction vessel having a capacity of about 3 L and equipped with a stirrer, a nitrogen gas inlet, and a condensed water discharge port, 730.8 g of adipic acid, 0.6322 g of sodium hypophosphite monohydrate, and 0.4404 g of sodium acetate were charged, and after thoroughly purging the inside of the vessel with nitrogen, the added components were melted at 170° C. while feeding a nitrogen gas at a rate of 20 mL/min into the vessel. 681.0 g of metaxylylenediamine (MXDA) (manufactured by Mitsubishi Gas Chemical Company, Inc.) was added dropwise thereto while gradually heating the vessel up to 250° C., and the polymerization was developed for about 2 hours, thereby obtaining polymetaxylyleneadipamide (MXD6). The melting point of the resultant polyamide resin (MXD6) was 237° C., and the density thereof was 1.22 g/cm³.

Examples 1 to 11 and Comparative Example 4

The polyamide resin (A) and the resin (B) of the types shown in Tables 1 and 2 were blended (dry-blended) in the ratio by mass shown in Tables 1 and 2 to prepare resin mixtures. Next, the resin mixture was put into a single-screw extruder. In a single-layer tube molding machine composed of one single-screw extruder, a single-layer tube having an outer diameter of 8 mm and a wall thickness of 1 mm was produced. The extrusion condition for the single-screw extruder was as follows.

The ratio by volume of the polyamide resin (A) and the resin (B) was calculated from the ratio by mass of the resins fed into the apparatus and the density of each resin, and the obtained ratios were shown in Tables 1 and 2.

1) Cylinder preset temperature:
In Examples 1 to 9, and 11 and Comparative Example 4, the temperature was 260° C. (melting point of MXD6+23° C.); and in Example 10, the temperature was 280° C. (melting point of PA9T+18° C.).
2) Screw type: full-flight screw
3) Screw shape: L/D=25
4) Compression ratio: 3.0

Comparative Examples 1 and 2

The polyamide resin (A) of the type shown in Table 2 was put into a single-screw extruder. In a single-layer tube molding machine composed of one single-screw extruder, a single-layer tube having an outer diameter of 8 mm and a wall thickness of 1 mm was produced. The extrusion condition for the single-screw extruder was as follows.

1) Cylinder preset temperature: 240° C.
2) Screw type: full-flight screw
3) Screw shape: L/D=25
4) Compression ratio: 3.0

Comparative Example 3

The polyamide resin (A) and the resin (B) of the types shown in Table 2 were blended (dry-blended) in the ratio by mass shown in Table 2 to prepare a resin mixture. Next, the resin mixture was put into a twin-screw extruder. In a single-layer tube molding machine composed of one twin-screw extruder, a single-layer tube having an outer diameter of 8 mm and a wall thickness of 1 mm was produced.

The ratio by volume of the polyamide resin (A) and the resin (B) was calculated from the ratio by mass of the resins fed into the apparatus and the density of each resin, and the obtained ratio was shown in Table 2.

The extrusion condition for the twin-screw extruder was as follows.

1) Cylinder preset temperature: 260° C.
2) Screw type: screw having a kneading zone with a kneading disc having a length of 6 times the diameter of the screw.
3) Screw shape: L/D=32

Reference Example 1

Polyamide 12 and polyamide 9T were individually put into respective single-screw extruders. In a multilayer tube molding machine composed of two single-screw extruders, a multilayer tube having an outer diameter of 8 mm and a wall thickness of 1 mm was produced. The thickness of the polyamide 12 (PA12) layer was 800 μm, and the thickness of the polyamide 9T (PA9T) layer was 200 μm. In the tube of Reference Example 1, PA12 and PA9T were layered in that order from the outside of the tube.

Reference Example 2

100 parts by mass of a resin mixture composed of polymetaxylyleneadipamide (45 mass %) and polyamide 11 (55 mass %), and 0.7 parts by mass of an aliphatic polycarbodiimide compound ("Carbodilite LA-1" manufactured by Nisshinbo Co., Ltd.) were dry-blended. Subsequently, the resultant thermoplastic resin mixture was, via a metering feeder at a rate of 6 kg/hr, fed into a twin-screw extruder having a cylinder diameter of 37 mm and equipped with a strongly-kneading type screw having a residence area with a barbed element. Under conditions at a cylinder temperature of 270° C. and at a screw rotation number of 100 rpm, these were melt-kneaded, and the melt strand was cooled and solidified with cooling air, and pelletized to give pellets of a thermoplastic resin composition 1.

Next, in place of the polyamide 9T in Reference Example 1, the thermoplastic resin composition 1 was used, and in the same manner as in Reference Example 1, a two-type two-layer multilayer tube having a layer configuration of PA12 layer/(MXD6+PA11+carbodiimide) layer was produced. The multilayer tube had an outer diameter of 8 mm and a wall thickness of 1.0 mm. The thickness of the PA12 layer was 800 μm, and the thickness of the (MXD6+PA11+carbodiimide) layer was 200 μm.

sufficient fuel permeation resistance. This is clear from comparison between FIG. 1 and FIG. 2.

In turn, when the amount of the polyamide resin (A) was smaller than that of the resin (B) in terms of the volume basis as in Comparative Example 4, sufficient flexibility could not

TABLE 1

| | | Example | | | | | | | | |
|---|---|---|---|---|---|---|---|---|---|---|
| | | 1 | 2 | 3 | 4 | 5 | 6 | 7 | 8 | 9 |
| Ingredients of Resin Composition | Polyamide Resin (A) | PA11 | PA11 | PA11 | PA11 | PA12 | PA12 | PA12 | PA12 | PA12 |
| | Resin (B) | MXD6 | MXD6 | MXD6 | MXD6 | MXD6 | MXD6 | MXD6 | MXD6 | MXD6 |
| | Polyamide Resin (A)/Resin (B) (ratio by weight) | 90:10 | 80:20 | 70:30 | 60:40 | 90:10 | 80:20 | 70:30 | 60:40 | 50:50 |
| | Polyamide Resin (A)/Resin (B) (ratio by volume) | 91:9 | 82:18 | 73:27 | 64:36 | 91.5:8.5 | 83:17 | 74:26 | 64:36 | 54:46 |
| Extruder | Type of Extruder | single-screw | single-screw | single-screw | single-screw | single-screw | single-screw | single-screw | single-screw | single-screw |
| | Number of extruders necessary for production | one | one | one | one | one | one | one | one | one |
| | Mean Disperse Particle Diameter of Resin (B) (nm) | 470 | 650 | 880 | 1150 | 450 | 600 | 870 | 1200 | 2500 |
| Evaluation | Flexibility Tensile Elastic Modulus MPa | 490 | 630 | 935 | 1240 | 470 | 580 | 880 | 1120 | 1480 |
| | Evaluation Tensile Elongation % | 470 | 480 | 450 | 420 | 540 | 520 | 520 | 490 | 360 |
| | Result | G | G | G | G | G | G | G | G | G |
| | Alcohol Gasoline Permeation Resistance Evaluation (g/m² · day) | 12 | 10 | 7 | 4 | 14 | 12 | 10 | 6 | 4 |
| | | G | G | G | G | G | G | G | G | G |

TABLE 2

| | | Example | | Comparative Example | | | | Reference Example | |
|---|---|---|---|---|---|---|---|---|---|
| | | 10 | 11 | 1 | 2 | 3 | 4 | 1 | 2 |
| Ingredients of Resin Composition | Polyamide Resin (A) | PA12 | PA1010 | PA12 | PA11 | PA11 | PA12 | PA12/PA9T two-layer structure | PA12/(MXD6 + PA11 + carbodiimide) two-layer structure |
| | Resin (B) | PA9T | MXD6 | — | — | MXD6 | MXD6 | | |
| | Polyamide Resin (A)/Resin (B) (ratio by weight) | 70:30 | 70:30 | 100:0 | 100:0 | 80:20 | 45:55 | | |
| | Polyamide Resin (A)/Resin (B) (ratio by volume) | 72:28 | 73:27 | 100:0 | 100:0 | 82:18 | 49:51 | | |
| Extruder | Type of Extruder | single-screw | single-screw | single-screw | single-screw | twin-screw | single-screw | single-screw | single-screw |
| | Number of extruders necessary for production | one | one | one | one | one | one | two | two |
| | Mean Disperse Particle Diameter of Resin (B) (nm) | 640 | 720 | — | — | 120 | — | — | — |
| Evaluation | Flexibility Tensile Elastic Modulus MPa | 920 | 940 | 330 | 340 | 630 | 1680 | 970 | 1230 |
| | Evaluation Tensile Elongation % | 450 | 310 | 550 | 560 | 480 | 85 | 360 | 380 |
| | Result | G | G | G | G | G | P | G | G |
| | Alcohol Gasoline Permeation Resistance Evaluation (g/m² · day) | 11 | 6 | 22 | 16 | 16 | 3 | 10 | 10 |
| | | G | G | P | P | P | G | G | G |

As clear from the results in Tables 1 and 2, the fuel-barrier layer in Reference Examples 1 and 2 needs to have a two-layer configuration in order to exhibit the barrier performance against alcohol gasoline, but in the molded articles of Examples 1 and 11, although the fuel-barrier layer to exhibit barrier performance against alcohol gasoline is a single layer, the tubes exhibited flexibility and fuel permeation resistance on the level comparable to those in Reference Examples 1 and 2.

On the other hand, as shown in Comparative Examples 1 and 2, the resin layer formed of a resin rich in flexibility alone was excellent in the flexibility of the molded article, but the fuel permeation resistance thereof was not sufficient. In Comparative Example 3, the resin composition of the fuel-barrier layer was the same as that in Example 2, but the resin composition was kneaded in a twin-screw extruder, so that the mean disperse particle size of the resin (B) was less than 150 nm, and therefore, the tube could not realize be realized, even if the materials of the resin mixture were kneaded in a single-screw extruder.

The molded article of the present invention is excellent in flexibility and fuel permeation resistance, and is therefore favorably used for various types of tubular structures, especially for fuel tubes, fuel pipes, fuel hoses and connectors connecting them.

The invention claimed is:

1. A molded article comprising a fuel-barrier layer formed of a resin composition that comprises a polyamide resin (A) as a continuous phase and a resin (B) as a disperse phase, wherein:

the polyamide resin (A) is a polyamide resin (A1) comprising at least one of a constituent unit derived from a lactam having 10 to 12 carbon atoms and a constituent unit derived from an aminocarboxylic acid having 10 to 12 carbon atoms, or a polyamide resin (A2) comprising a constituent unit derived from an aliphatic diamine having 6 to 12 carbon atoms and a constituent unit derived from an aliphatic dicarboxylic acid having 10 to 12 carbon atoms, the resin (B) is a resin selected from a semi-aromatic polyamide resin, the ratio by volume of polyamide resin (A)/resin (B) is 95/5 to 51/49, the mean disperse particle diameter of the resin (B) is 150 nm or more, a tensile elastic modulus of the molded article is 1,500 MPa or less, and the molded article is a tubular structure.

2. The molded article according to claim 1, wherein the semi-aromatic polyamide resin is:

a polyamide resin (B1) in which 70 mol % or more of a diamine constituent unit is derived from metaxylylenediamine and 70 mol % or more of a dicarboxylic acid constituent unit is derived from an α,ω-linear aliphatic dicarboxylic acid having 4 to 8 carbon atoms, or a polyamide resin (B2) in which 70 mol % or more of a diamine constituent unit is derived from an aliphatic diamine having 9 to 12 carbon atoms and 70 mol % or more of a dicarboxylic acid constituent unit is derived from terephthalic acid.

3. The molded article according to claim 1, wherein the polyamide resin (A) is one or more selected from the group consisting of polyamide 11, polyamide 12, polyamide 10,10, polyamide 10,12, polyamide 6,11 and polyamide 6,12.

4. The molded article according to claim 1, wherein the resin (B) is polymetaxylyleneadipamide.

5. The molded article according to claim 1, wherein the tubular structure is a fuel tube, a fuel pipe, a fuel hose or a connector.

6. A method for producing a molded article comprising a fuel-barrier layer of a resin composition that comprises a polyamide resin (A) as a continuous phase and a resin (B) as a disperse phase, from the polyamide resin (A) and the resin (B) using an extruder having a cylinder and a screw, wherein:

the extruder is a single-screw extruder, the polyamide resin (A) is a polyamide resin (A1) containing at least one of a constituent unit derived from a lactam having 10 to 12 carbon atoms and a constituent unit derived from an aminocarboxylic acid having 10 to 12 carbon atoms, or a polyamide resin (A2) containing a constituent unit derived from an aliphatic diamine having 6 to 12 carbon atoms and a constituent unit derived from an aliphatic dicarboxylic acid having 10 to 12 carbon atoms, the resin (B) is a resin selected from a semi-aromatic polyamide resin, the polyamide resin (A) and the resin (B) are dry-blended in such a range that the ratio by volume of polyamide resin (A)/resin (B) is 95/5 to 51/49, and the resulting resin composition containing the polyamide resin (A) and the resin (B) is extruded out through the single-screw extruder to form the fuel-barrier layer, the mean disperse particle diameter of the resin (B) is 150 nm or more, a tensile elastic modulus of the molded article is 1,500 MPa or less, and the molded article is a tubular structure.

7. The method for producing a molded article according to claim 6, wherein the semi-aromatic polyamide resin is:

a polyamide resin (B1) in which 70 mol % or more of a diamine constituent unit is derived from metaxylylenediamine and 70 mol % or more of a dicarboxylic acid constituent unit is derived from an α,ω-linear aliphatic dicarboxylic acid having 4 to 8 carbon atoms, or a polyamide resin (B2) in which 70 mol % or more of a diamine constituent unit is derived from an aliphatic diamine having 9 to 12 carbon atoms and 70 mol % or more of a dicarboxylic acid constituent unit is derived from terephthalic acid.

8. The method for producing a molded article according to claim 6, wherein the polyamide resin (A) is one or more selected from the group consisting of polyamide 11, polyamide 12, polyamide 10,10, polyamide 10,12, polyamide 6,11 and polyamide 6,12.

9. The method for producing a molded article according to claim 6, wherein the resin (B) is polymetaxylyleneadipamide.

10. The method for producing a molded article according to claim 6, wherein the screw of the single-screw extruder is a full-flight screw.

11. The method for producing a molded article according to claim 6, wherein the ratio of the effective length L of the screw of the single-screw extruder to the diameter D of the screw thereof, L/D is 20 to 40.

12. The method for producing a molded article according to claim 6, wherein the screw of the single-screw extruder comprises a feeding zone and a metering zone and wherein the ratio of the cross section (F) of the screw in the feeding zone to the cross section (M) of the screw in the metering zone (F/M) is 2.0 to 3.5.

13. The method for producing a molded article according to claim 6, wherein the temperature of the cylinder of the single-screw extruder is in a range of from the melting point Tm of the resin (B) to the melting point Tm of the resin (B)+50° C.

* * * * *